(12) United States Patent
Campanale et al.

(10) Patent No.: US 11,830,258 B2
(45) Date of Patent: Nov. 28, 2023

(54) METHOD AND CONTROL UNIT FOR OPERATING AN AUTOMATED LONGITUDINAL AND/OR LATERAL GUIDANCE FUNCTION OF A VEHICLE

(71) Applicant: Bayerische Motoren Werke Aktiengesellschaft, Munich (DE)

(72) Inventors: Vincenzo Campanale, Moncalieri (IT); Orland Gonzalez, Munich (DE); Almir Mehmedovic, Neufahrn (DE); Josef Mehringer, Gmund (DE); Christoph Pietruska, Munich (DE); Andreas Stump, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 278 days.

(21) Appl. No.: 17/292,629

(22) PCT Filed: May 28, 2019

(86) PCT No.: PCT/EP2019/063856
§ 371 (c)(1),
(2) Date: May 10, 2021

(87) PCT Pub. No.: WO2020/104076
PCT Pub. Date: May 28, 2020

(65) Prior Publication Data
US 2022/0009526 A1  Jan. 13, 2022

(30) Foreign Application Priority Data
Nov. 23, 2018  (EP) .................................. 18207969

(51) Int. Cl.
*B60W 60/00*  (2020.01)
*G06V 20/56*  (2022.01)
(Continued)

(52) U.S. Cl.
CPC .......... *G06V 20/588* (2022.01); *B60W 30/12* (2013.01); *B60W 30/165* (2013.01);
(Continued)

(58) Field of Classification Search
CPC .. G06V 20/588; B60W 30/12; B60W 30/165; B60W 40/04; B60W 40/06;
(Continued)

(56) References Cited

U.S. PATENT DOCUMENTS

2017/0322314 A1\* 11/2017 Yang ..................... G01S 5/0072
2018/0237012 A1   8/2018 Jammoussi et al.

FOREIGN PATENT DOCUMENTS

WO   WO 2016/090571 A1   6/2016

OTHER PUBLICATIONS

International Search Report (PCT/ISA/210) issued in PCT Application No. PCT/EP2019/063856 dated Oct. 11, 2019 (eight (8) pages).

(Continued)

*Primary Examiner* — Kenneth J Malkowski
(74) *Attorney, Agent, or Firm* — Crowell & Moring LLP (57) ABSTRACT

A control unit and method for an autonomous and/or semi-autonomous ego vehicle are provided. The control unit is configured to determine a course of an ego lane, referred to as the behavioral ego lane, within which the ego vehicle is driving, based on driving trajectories of a plurality of vehicles within an environment of the ego vehicle. The control unit is configured to operate an automated longitudinal and/or lateral guidance function of the ego vehicle in dependence of the course of the behavioral ego lane.

12 Claims, 6 Drawing Sheets

(51) Int. Cl.
*B60W 40/04* (2006.01)
*B60W 40/06* (2012.01)
*B60W 30/12* (2020.01)
*B60W 30/165* (2020.01)

(52) U.S. Cl.
CPC .......... *B60W 40/04* (2013.01); *B60W 40/06* (2013.01); *B60W 60/00272* (2020.02); *B60W 60/00274* (2020.02); *B60W 60/00276* (2020.02); *B60W 2552/53* (2020.02)

(58) Field of Classification Search
CPC ..... B60W 60/00274; B60W 60/00276; B60W 2552/53
See application file for complete search history.

(56) References Cited

OTHER PUBLICATIONS

Written Opinion (PCT/ISA/237) issued in PCT Application No. PCT/EP2019/063856 dated Oct. 11, 2019 (eight (8) pages).
Klotz A. et al., "Lane data fusion for driver assistance systems", Proceedings of the International Conference on Information Fusion, vol. 2, Jan. 1, 2004 (Jan. 1, 2004), pp. 657-663, XP009082998 (nine (9) pages).
Polychronopoulos A. et al: "Extended path prediction using camera and map data for lane keeping support", 2005 IEEE Intelligent Transportation Systems Conference (ITSC); Vienna, Austria; Sep. 13-16, 2005, EEE, Piscataway, NJ, USA, Sep. 13, 2005 (Sep. 13, 2005), pp. 602-607, XP010843091 (six (6) pages).
Flade B. et al., "Behavior-based relative self-localization in intersection scenarios", 2017 IEEE 20th International Conference on Intelligent Transportation Systems (ITSC), IEEE, Oct. 16, 2017 (Oct. 16, 2017), pp. 1-8, XP033330433 (eight (8) pages).
Franke U. et al., "Autonomous Driving Goes Downtown", IEEE Expert, IEEE Service Center, New York, NY, US, vol. 13, No. 6, Nov. 1, 1998 (Nov. 1, 1998), pp. 40-48, XP000848997 (nine (9) pages).
Tan Y. et al., "A Radar Guided Vision System for Vehicle Validation and Vehicle Motion Characterization", Intelligent Transportation Systems Conference, 2007. ITSC 2007. IEEE, IEEE, PI, Sep. 1, 2007 (Sep. 1, 2007), pp. 1059-1066, XP031151499 (eight (8) pages).
Guo C. et al., "Improved lane detection based on past vehicle trajectories", 17th International IEEE Conference on Intelligent Transportation Systems (ITSC), IEEE, Oct. 8, 2014 (Oct. 8, 2014), pp. 1956-1963, XP032685535 (eight (8) pages).
Thomas J. et al., "Grid-based online road model estimation for advanced driver assistance systems", 2015 IEEE Intelligent Vehicles Symposium (IV), IEEE, Jun. 28, 2015 (Jun. 28, 2015), pp. 71-76 XP033209705 (six (6) pages).
Schroedl S. et al., "Mining GPS Traces for Map Refinement", Data Mining and Knowledge Discovery, Kluwer Academic Publishers, BO, vol. 9, No. 1, Jul. 1, 2004 (Jul. 1, 2004), pp. 59-87, XP019277108 (29 pages).
Damerow F. et al., "Spatio-temporal trajectory similarity and its application to predicting lack of interaction in traffic situations", 2016 IEEE 19th International Conference on Intelligent Transportation Systems (ITSC), IEEE, Nov. 1, 2016, pp. 2512-2519, XP033028734 (eight (8) pages).
Bartels A. et al., "Intelligence in the Automobile of the Future" In: "Smart Mobile in Vehicle Systems", Nov. 5, 2013, Springer, New York, NY, XP055628438, ISBN: 978-1-4614-9120-0 pp. 35-46, XP055628438 (12 pages).

\* cited by examiner

METHOD AND CONTROL UNIT FOR OPERATING AN AUTOMATED LONGITUDINAL AND/OR LATERAL GUIDANCE FUNCTION OF A VEHICLE

BACKGROUND AND SUMMARY

The present document is directed at vehicles, notably at autonomous or semi-autonomous vehicles. In particular, the present document is directed at adapting the driving strategy for an autonomous or semi-autonomous vehicle, based on the collective behavior of other vehicles in the environment of the vehicle.

Autonomous and/or semi-autonomous driving vehicles are guided by systems that detect the geometry and/or the course of a lane of a road. The geometry and/or the course of a lane of a road may be determined using sensors that are able to recognize the boundaries of the lane, for example by detecting the lane markings that demarcate them. Further, the geometry and/or the course of a lane of a road may be determined using map data. A lane which is detected based on lane markings and/or map data may be referred to herein as a sensed lane.

Map data might not be available in unmapped regions, and is often unreliable in construction areas. In addition, sensors, e.g. camera sensors, may fail to detect the geometry of a lane in bad weather conditions or may fail to detect the geometry of a lane of roads which have no, faded, or false lane markings.

If the geometry and/or the course of a lane (i.e. a sensed lane) of a road cannot be detected in a reliable manner, e.g. due to bad weather conditions and/or due to missing or unreliable lane markings, a driving strategy and/or a driving function of an autonomous and/or semi-autonomous vehicle may be affected. The present document is directed at the technical problem of proving a reliable and safe driving function for an autonomous and/or semi-autonomous vehicle, without the need of using map data and/or sensor data regarding lane markings. The technical problem is solved by the independent claims. Preferred examples are specified in the dependent claims.

According to an aspect, a control unit for an autonomous and/or semi-autonomous ego vehicle (notably a two-track vehicle, such as a car, a truck, a bus, etc.) is described. The control unit is configured to determine the course of an ego lane, referred to as the behavioral ego lane, within which the ego vehicle is driving, based on driving trajectories of a plurality of vehicles within an environment of the ego vehicle. The behavioral ego lane may be determined without taking into account map data and/or sensor data with regards to lane markings on the road that the vehicle is driving on. In particular, the behavioral ego lane may be determined (solely) based on the collective behavior of vehicles within the environment of the ego vehicle. The behavior of the vehicles may be described using the driving trajectories of the vehicles.

The control unit may be configured to determine trajectory data regarding the driving trajectories of the plurality of vehicles within the (direct) environment of the ego vehicle. The ego vehicle may comprise one or more environment sensors (such as a camera, a radar sensor, a lidar sensor, etc.). The sensor data of the one or more environment sensors may be used to determine an environment model of the environment of the vehicle, wherein the environment model may be indicative of objects (notably of other vehicles) within the environment of the ego vehicle. Furthermore, the environment model may be indicative of the driving trajectories of the other vehicles (wherein the driving trajectory of a vehicle may indicate the position of the vehicle as a function of time).

Furthermore, the control unit may be configured to cluster the driving trajectories within each of a sequence of segments of the road that the ego vehicle is driving on, in order to determine a sequence of shapes of the road for the corresponding sequence of segments. In other words, the road may be segmented into a sequence of segments. For each of the segments, the different driving trajectories may be compared, in order to identify a "main direction" of the plurality of driving trajectories within this segment. In particular, it may be determined in which direction the majority of vehicles is driving within each of the different segments. It may be assumed that the direction of the majority of driving trajectories within a segment corresponds to the direction or the course or the shape of the road within this segment. Hence, a sequence of shapes may be determined which describes the overall shape or course of the road. In particular, the course of the road along the sequence of segments may correspond to or may be determined based on the sequence of shapes (e.g. by filtering the sequence of shapes and/or by fitting an analytical function to the sequence of shapes).

Furthermore, the control unit may be configured to determine the number of lanes of the road. For this purpose, the control unit may be configured to assign the plurality of vehicles to one or more different adjacent lanes of the road. The number of lanes and/or the position of the lanes may be determined such that the different vehicles can be assigned to the different lanes in an unambiguous manner. The one or more different adjacent (behavioral) lanes also comprise the behavioral ego lane.

The course of the ego lane may be determined in a precise manner based on the sequence of shapes for the corresponding sequence of segments of the road, notably based on the course of the road.

Furthermore, a confidence measure for the determined course of the behavioral ego lane may be determined. The confidence measure may be indicative of the confidence that the course of the behavioral ego lane corresponds to the actual course of a lane of the road that the ego vehicle is driving on. Alternatively, or in addition, the confidence measure may be indicative of the confidence and/or the unambiguousness with which the behavioral ego lane has been determined. Typically, the confidence and/or the confidence measure increases with an increasing number of vehicles within the environment of the ego vehicle.

The control unit is further configured to operate an automated longitudinal and/or lateral guidance function of the ego vehicle, notably a vehicle following function (such as ACC) and/or an active lane keeping function, dependent on the course of the behavioral ego lane. As a result of this, a reliable and robust operation of an automated and/or semi-automated ego vehicle is enabled, notably without taking into account map data and/or lane markings on the road that the ego vehicle is driving on. Alternatively, or in addition, the course of the behavioral ego lane may be used to verify whether map data and/or (detected) lane markings can be trusted e.g., by comparing the determined course of the behavioral ego lane with the source of a sensed ego lane (as may be derived from map data and/or from sensor data which is indicative of the lane markings).

The longitudinal and/or lateral guidance function may comprise a vehicle following function which is configured to perform the longitudinal and/or lateral guidance of the ego vehicle in dependence of a target vehicle which is driving within the behavioral ego lane in front of the ego vehicle. The vehicle following function may be configured to keep the ego vehicle at a defined distance to the target vehicle and/or to adapt the speed of the ego vehicle in dependence of the speed of the target vehicle and/or to perform lateral movements of the ego vehicle in dependence of the trajectory of the target vehicle.

The control unit may be configured to determine the trajectory of the target vehicle, wherein this trajectory is referred to herein as the target trajectory. The target trajectory may be determined based on position and/or trajectory data (as outlined above). The target trajectory may be compared to the course of the behavioral ego lane, and the vehicle following function may be operated in dependence of the comparison of the target trajectory with the course of the behavioral ego lane, thereby increasing the reliability and the safety of the target following function of the ego vehicle.

In particular, the control unit may be configured to determine values of one or more deviation parameters which are indicative of an extent of the deviation of the target trajectory from the course of the behavioral ego lane. Example deviation parameters comprise a lateral offset between the target trajectory and the course of the behavioral ego lane, and/or an angle between the target trajectory and the course of the behavioral ego lane (at any point along the relevant longitudinal region). The vehicle following function may be operated in particularly robust and safe manner in dependence of the values of the one or more deviation parameters.

The control unit may be configured to determine whether the target trajectory deviates from the course of the behavioral ego lane by more than a deviation threshold. The deviation threshold may depend on the confidence measure with regards to the behavior ego lane, notably such that the deviation threshold increases (there allowing for an increased deviation) if the confidence measure decreases and/or such that the deviation threshold decreases if the confidence measure increases.

The vehicle following function may be automatically interrupted (at least with regards to the target vehicle), if a deviation parameter between the target trajectory and the collective behavioral ego lane (i.e. the course of the behavioral ego line) exceeds a given deviation threshold. As a result of this, the robustness and the safety of a vehicle following function may be increased.

The control unit may be configured to determine lane sensor data indicative of lane markings of a lane of the road that the ego vehicle is driving on (e.g. using a camera which is directed onto the surface of the road). Furthermore, the control unit may be configured to determine the course of the sensed ego lane based on the lane sensor data. The sensed ego lane may be determined based on the lane markings and possibly based on map data. On the other hand, the sensed ego lane may be determined independently of the behavior of the vehicles within the environment of the ego vehicle (notably independently of the trajectory data regarding the trajectories of the plurality of vehicles within the environment of the ego vehicle).

The lateral guidance of the ego vehicle may be performed (automatically) in dependence of the course of the sensed ego lane and in dependence of the course of the behavioral ego lane, in order to provide a lane keeping function for the ego vehicle. By taking into account the sensed ego lane and the behavioral ego lane, the robustness and the safety of the lane keeping function may be increased.

The control unit may be configured to compare the course of the sensed ego lane with the course of the behavioral ego lane. In particular, the values of one or more deviation parameters may be determined. Example deviation parameters comprise a lateral offset between the course of the sensed ego lane and the course of the behavioral ego lane, and/or an angle between the course of the sensed ego lane and the course of the behavioral ego lane. The lane keeping function may be operated in dependence of the comparison of the course of the sensed ego lane and the course of the behavioral ego lane.

Comparing the course of the sensed ego lane with the course of the behavioral ego lane may e.g. be useful at construction sites, where the lane markings on the road may be confusing. In particular, at construction sites original lane markings of a road may be overlaid with temporary lane markings that are valid for the duration of the construction site. By taking into account the determined course of the behavioral ego lane (in addition to the course of the sensed ego lane), the reliability of an active lane keeping function may be improved.

In particular, the control unit may be configured to determine whether the course of the sensed ego lane deviates from the course of the behavioral ego lane by more than a deviation threshold. The deviation threshold may depend on the confidence measure of the behavior ego lane, notably such that the deviation threshold increases if the confidence measure decreases and/or such that the deviation threshold decreases if the confidence measure increases.

The lane keeping function that is based (e.g. solely) on the sensed ego lane may be interrupted and/or the lane keeping function may be performed based on the behavioral ego lane, if it is determined that the course of the sensed ego lane deviates from the course of the behavioral ego lane by more than the deviation threshold. As a result of this, the robustness and/or the safety of a lane keeping function may be increased.

According to a further aspect, a motor vehicle (notably a car, a truck or a bus) is described, which comprises the control unit described in the present document.

According to another aspect, a method for operating an automated longitudinal and/or lateral guidance function of an ego vehicle is described. The method comprises determining a course of an ego lane, referred to as the behavioral ego lane, within which the ego vehicle is driving, based on driving trajectories of a plurality of vehicles within the environment of the ego vehicle. Furthermore, the method comprises operating the automated longitudinal and/or lateral guidance function of the ego vehicle based on the course of the behavioral ego lane.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document.

Furthermore, all aspects of the methods and systems outlined in the present patent application may be arbitrarily combined. In particular, the features of the claims may be combined with one another in an arbitrary manner.

The invention is explained below in an exemplary manner with reference to the accompanying drawings.

BRIEF DESCRIPTION OF THE DRAWINGS

The illustrations in the drawings are schematic. It is noted that in different figures, similar or identical elements are provided with the same reference signs or with reference signs, which are different from the corresponding reference signs only within the first digit.

DETAILED DESCRIPTION OF THE DRAWINGS

Figure 1:
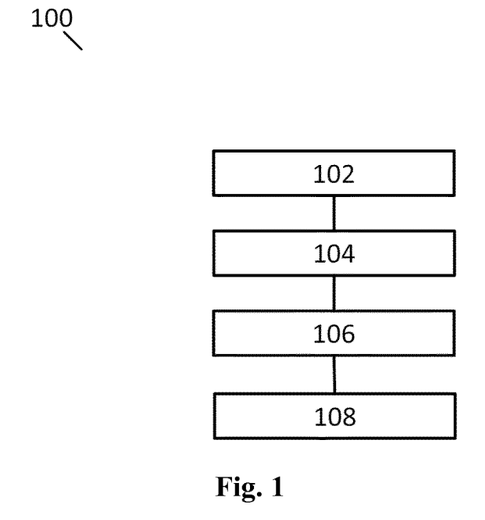
FIG. 1 shows an exemplary method for determining one or more lanes of a road.

FIG. 1 shows an exemplary method 100 for determining one or more lanes of a road in an environment of a vehicle (referred to herein as the ego vehicle). The lanes which are determined using method 100 are referred to herein as behavioral lanes, as they are determined based on the collective behavior of vehicles within the environment of an ego vehicle. The method 100 may be executed on a computer or an electronic control unit of the ego vehicle. The environment of the ego vehicle may be defined by a sensor-detectable area of the vehicle. The method 100 may comprise receiving and/or determining 102 a plurality of objects (e.g. other vehicles) in the environment of the ego vehicle. For example, the method 100 may receive and/or determine 102 the plurality of objects from an object detection component of the ego vehicle. For example, the method 100 may receive and/or determine 102 the plurality of objects from an environment model of the ego vehicle. The environment model of the ego vehicle may be generated by fusing sensor data from one or more environment sensors of the ego vehicle. Example environment sensors of the ego vehicle are a camera, a radar sensor, a lidar sensor, an ultrasonic sensor, etc.

The method 100 may further comprise receiving and/or determining 104 a plurality of trajectories for the plurality of objects (notably vehicles) in the environment of the ego vehicle. The plurality of trajectories may be received from a trajectory-determining component of the ego vehicle. For example, the plurality of trajectories may be determined by reconstructing a movement profile of the objects in the environment of the ego vehicle using temporal positions and odometry data of the objects. In other words, the plurality of trajectories may comprise observations regarding a movement of one or more objects of the plurality of objects in the past. The plurality of trajectories may be received from the environmental model of the ego vehicle.

Furthermore, the method 100 may comprise estimating and/or determining 106 a shape of the road based on the plurality of trajectories for the plurality of objects. When estimating 106 the shape of the road based on the plurality of trajectories, the method 100 may determine a number of segments for the road, may cluster the plurality of the trajectories in each of the one or more segments according to one or more measures of shape similarity, determine a cluster of trajectories of the clustered plurality of trajectories in each of the one or more segments, wherein the chosen cluster of trajectories may comprise a majority of trajectories having an equal or similar shape in a particular segment of the one or more segments, and estimate the overall shape of the road based on the determined cluster of trajectories in each of the one or more segments.

Figure 2:
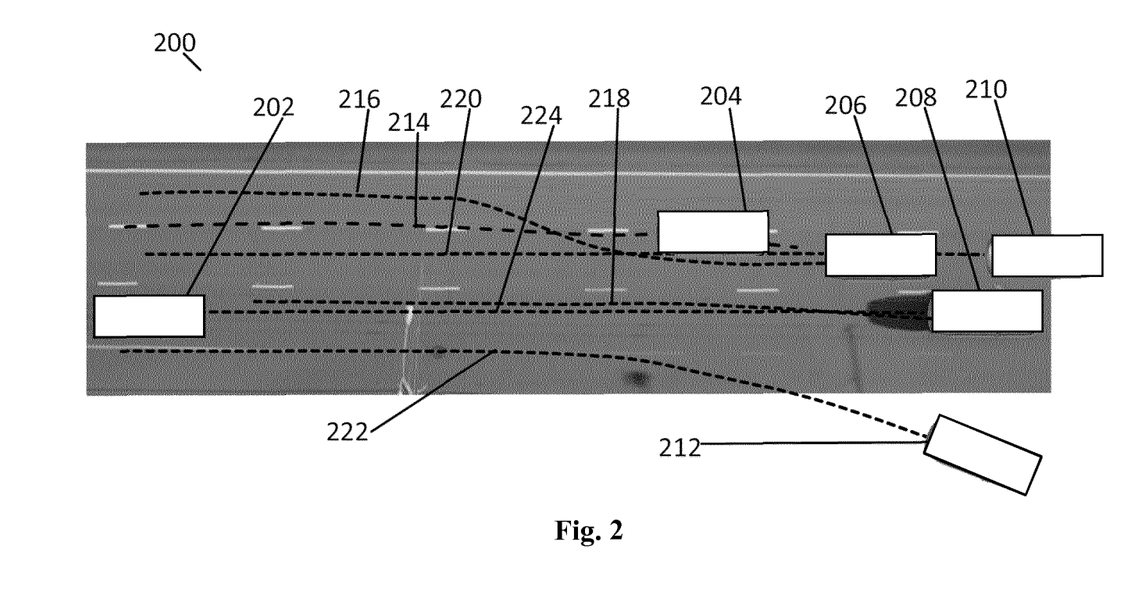
FIG. 2 shows an exemplary traffic scenario of a road.
Figure 3:
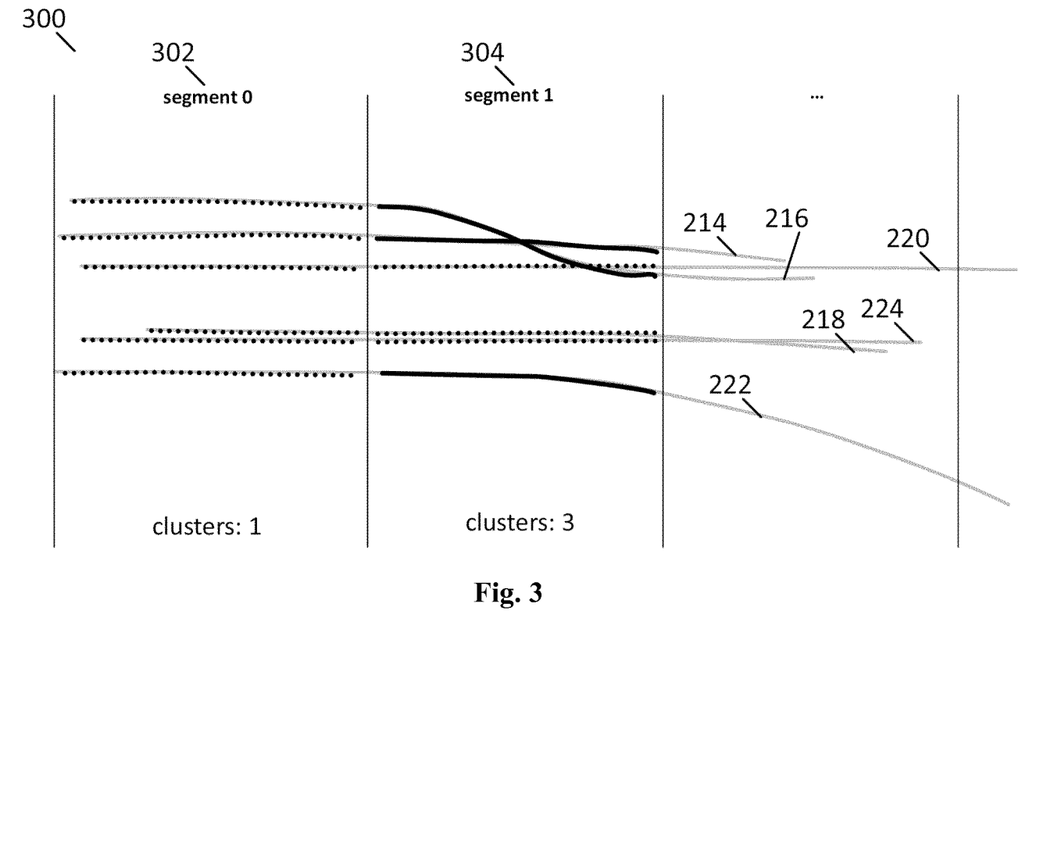
FIG. 3 shows exemplary segments and trajectory-clusters of a traffic scenario of a road.
Figure 4:
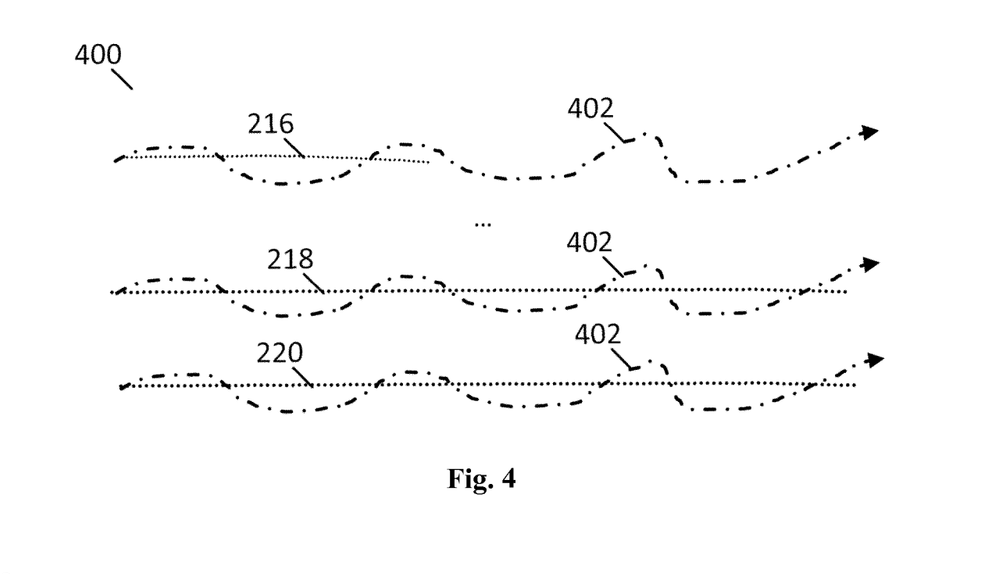
FIG. 4 shows an exemplary multi-curve fitting function to estimate the shape of a road.

FIGS. 2 to 4 show an exemplary estimation of a shape of a road in an environment of the ego vehicle. In particular, FIG. 2 shows an exemplary traffic scenario 200 of a road, which may be detected by vehicle 202 (also referred to herein as the ego-vehicle). The vehicle 202 may determine and/or detect a plurality of vehicles in the environment of the vehicle 202 comprising vehicles 204, 206, 208, 210, and 212. Additionally, the plurality of vehicles may comprise the ego vehicle 202. The vehicle 202 may further determine a plurality of trajectories corresponding to the vehicle 202 to 212 comprising trajectories 214, 216, 218, 220, 222, and 224. Trajectory 214 may relate to vehicle 204, trajectory 216 may relate to vehicle 206, trajectory 218 may relate to vehicle 208, trajectory 220 may relate to vehicle 210, trajectory 222 may relate to vehicle 212, and trajectory 224 may relate to vehicle 202.

FIG. 3 presents an exemplary segmented clustering 300 of the plurality of trajectories of the exemplary traffic scenario 200 of FIG. 2. In particular, the segmented clustering 300 comprises exemplary segments 302 and 304 or the road (along the longitudinal direction of the road). Each segment 302, 304 comprises at least parts of one or more trajectories of the plurality of trajectories 214 to 224. For example, segment 302 comprises a part of each trajectory of the plurality of trajectories and segment 304 comprises also a part of each trajectory of the plurality of trajectories. The parts of the trajectories within a particular segment, e.g. segment 302 or segment 304, are clustered to form one or more shapes of the trajectories in the particular segment using one or more measures of similarity. As depicted in FIG. 3, segment 302 comprises a single cluster since all trajectories of the segment 302 have a similar or equal shape. Further, the segment 304 comprises three clusters: a first cluster comprising trajectory 216, a second cluster comprising the trajectory 214 and the trajectory 222, and a third cluster comprising the trajectories 218, 220, and 224.

In each segment, a cluster of trajectories may be determined that comprises a majority of trajectories (e.g. which comprises the highest number of trajectories, compared to the other clusters). For example, segment 302 comprises a single cluster of trajectories since all trajectories have a similar or equal shape. Thus, the single cluster of trajectories of the segment 302 comprises the majority of trajectories. The segment 304 has three clusters. The third cluster of trajectories of segment 304 comprises three trajectories and, thus, comprises the majority of trajectories in the segment 304.

To determine whether a shape of a pair of trajectories of a segment is similar or equal, different approaches may be used. For example, a lateral distance between two trajectories may be computed in the distinct region defined by a particular segment. When the distance is below a predefined threshold, the trajectories are assumed to the similar or equal. Additionally, or alternatively, a span of lateral deviations, a longitudinal distance before reaching a particular lateral divergence, a heading angle deviation, and/or time-warping based measures may be used to determine whether two or more trajectories are similar or equal to each other.

In addition, a consistency check may be performed when determining the (majority) cluster of trajectories from the plurality of trajectories in each of the one or more segments. If a particular segment has a preceding segment, e.g. segment 304 has a preceding segment 302, and the cluster of trajectories of the particular segment comprising the majority of trajectories deviates from or is not consistent with the determined cluster of trajectories of the preceding segment, a cluster of the trajectories of the particular segment may be selected which does not comprise the majority of trajectories. For example, a cluster of trajectories of the particular segment comprising the majority of trajectories might not be consistent with the determined cluster of trajectories of the preceding segment when one or more trajectories of the cluster of trajectories of the majority of trajectories of the preceding segment are not continued without interruption by one or more trajectories of the cluster of the trajectories comprising the majority of trajectories of the particular segment. In this case, a different cluster of trajectories may be determined for the particular segment, notably a cluster in which trajectories display a higher degree of continuity with respect to the trajectories of the selected cluster of trajectories in neighboring segments.

FIG. 4 shows an exemplary estimation 400 of the shape of the road for the exemplary traffic scenario of FIG. 2 using a multi-curve fitting process. The estimation of the shape of the road is based on the trajectories included in the determined clusters of trajectories of all segments. For example, FIG. 4 shows an exemplary multi-curve fitting function 402 for the parts of the trajectories 216, 218, and 220 which are included in the determined clusters of trajectories. Preferably, the multi-curve fitting function 402 describes a curve that optimally fits all trajectories included in the determined clusters of trajectories simultaneously. The shape of the curve of the multi-curve fitting function may be used to estimate the shape of the road. For example, the shape-approximating curve may be obtained by simultaneously fitting an approximative clothoid function to the trajectories—with a specific lateral offset parameter for each trajectory—using regression methods.

Further, the method 100 may comprise determining 108 the one or more lanes of the road (referred to herein as the behavioral lanes) using the estimated shape of the road and the plurality of objects and/or the plurality of trajectories of the plurality of objects. For determining 208 the one or more lanes of the road, the method 100 may generate a candidate lane for each trajectory of the plurality of trajectories, wherein a shape of the candidate lane is similar or equal to the estimated shape of the road, and wherein a trajectory of the plurality of trajectories is in the center or within a predefined range around the center of the candidate lane, at least in a segment where the shape of the trajectory is similar or equal to the estimated shape of the road. Further, the method 100 may determine one or more sets of lanes, also referred to as lane configuration in the following, from the generated candidate lanes, wherein the set of lanes comprises only lanes from the generated candidate lanes which are distinct to each other, and determine a score value for each lane configuration of the determined one or more lane configurations, wherein the score value is incremented when a trajectory of a particular lane of a set of lanes is in the center or within a predefined range around the center of the particular lane. Finally, the method 100 may determine the one or more lanes of the road based on the set of lanes which has the largest score value. The one or more (collective behavioral) lanes of the road may have the same shape as the estimated shape of the road in the vicinity of the ego vehicle 202.

Figure 5:
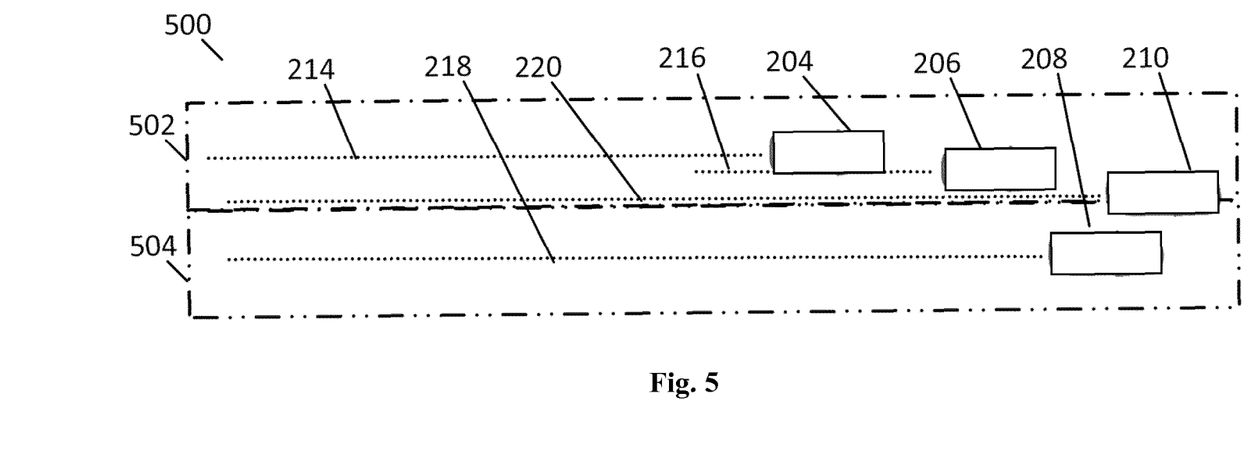
FIG. 5 shows a first example of a lane configuration.
Figure 6:
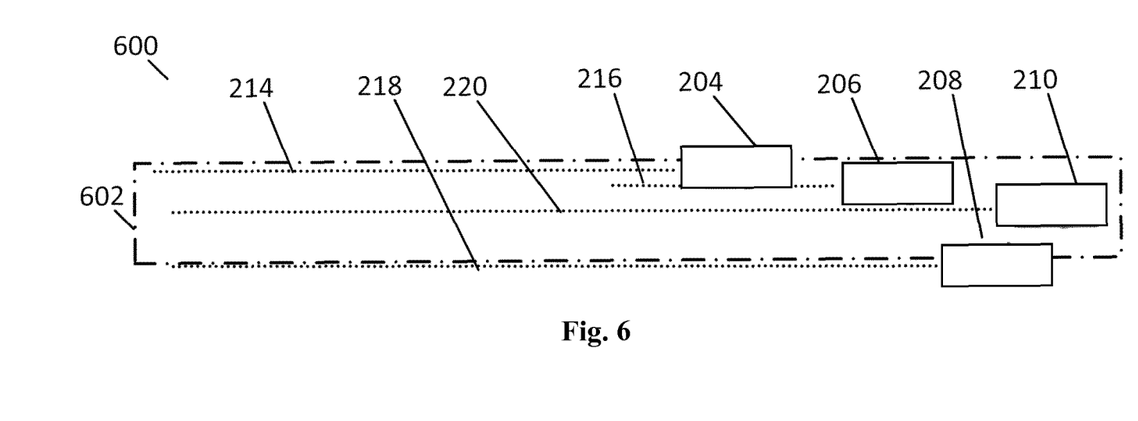
FIG. 6 shows a second example of a lane configuration.
Figure 7:
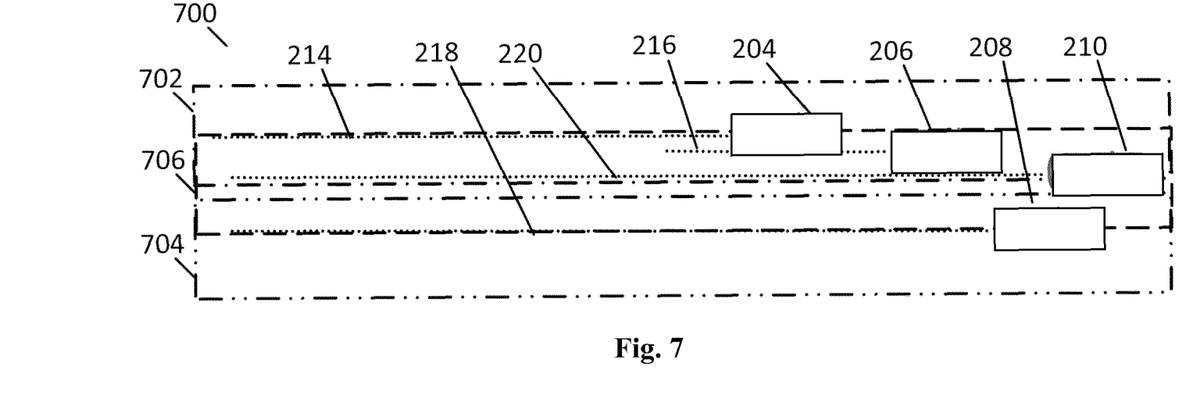
FIG. 7 shows a third example of a lane configuration.

FIGS. 5 to 7 illustrate an exemplary process for determining 108 one or more lanes of the road using the estimated shape of the road, using the plurality of objects and using the plurality of trajectories of the plurality of objects. In particular, FIG. 5 shows a first example of a lane configuration 500, FIG. 6 shows a second example of a lane configuration 600, and FIG. 7 shows a third example of a lane configuration 700. In general, a lane configuration may fulfil a predefined set of constraints. Preferably, each lane of a lane configuration must have a shape equal to the estimated shape of the road. Further, preferably, two adjacent lanes of a lane configuration must be separated by a predefined minimum distance, e.g. 2 meters.

To determine one or more lanes of the road, trajectories of the plurality of trajectories are determined which are at least partially similar or equal to the estimated shape of the road. For each trajectory which is at least partially similar or equal to the estimated shape of the road, a candidate lane is generated. A candidate lane may be a possible lane of the road. A lane configuration comprises one or more candidate lanes. A candidate lane may be taken into account by a lane configuration if the candidate lane fulfils the constraints of a lane configuration as described above. Preferably, a candidate lane is centered on a trajectory of the plurality of trajectories at least in parts where the trajectory is similar or equal to the estimated shape of the road.

As depicted in FIG. 5, the lane configuration 500 may comprise a candidate lane 502 and a candidate lane 504. The candidate lane 502 may be centered on a combination of the trajectory 214 and the trajectory 216. The candidate lane 504 may be centered on the trajectory 218. The candidate lane 502 and the candidate lane 504 share a border between each other. FIG. 6 depicts the lane configuration 600 which comprises a single candidate lane 602. The single candidate lane is centered on the trajectory 220. FIG. 7 presents the lane configuration 700, which comprises three candidate lanes: a candidate lane 702 which is centered on the combination of the trajectory 214 and the trajectory 216, a candidate lane 704 which is centered on the trajectory 218, and a candidate lane 706 which is centered on the trajectory 220.

In addition, the method 100 may comprise determining a score value for each set of lanes or lane configuration of the determined one or more sets of lanes or one or more lane configurations. The score value of a lane configuration may be incremented when a trajectory is in the center or within a predefined range around the center of the particular lane, e.g. a particular candidate lane. In other words, the score value defines how many trajectories may be covered by a particular set of lanes or a particular lane configuration. The lane configuration 500 may have a score value of 3 since three trajectories are covered by the candidate lanes 502, 504 of the lane configuration 500. The lane configuration 600 may have a score value of 1 since only one trajectory is covered by the candidate lane 602. The lane configuration 700 may have a score value of 4 since four trajectories are covered by the candidate lanes 702, 704, 706. However, the candidate lanes 702, 704, 706 of the lane configuration 700 overlap, and thus do not fulfil the constraints of a lane configuration. Accordingly, the lane configuration 500 has the largest score value. The method 100 may determine the lanes of the road based on the lane configuration 500 since the lane configuration 500 provides the largest score value.

Advantageously, lanes of a road may be determined using the trajectories of the objects describing a collective behavior of the objects in the vicinity of an ego vehicle 202. This allows the use of (semi-)autonomous driving features or functions of the vehicle to continue operation when lane detection systems based on the identification of lane markings would no longer be available. Further, the method may allow (semi-)autonomous driving systems to evaluate the quality of the data provided by markings-based lane-detection systems. In addition, the method may efficiently support driver assistance systems. For example, if it is observed that a majority of objects are curving to the right, the driver assistance system may use this information to infer the presence and geometry of the lanes when no further information regarding the lanes of the road is available.

The method 100 as described above may determine one or more (behavioral) lanes of a road. The determined lanes of the road may be used by various driver assistance systems to provide more robust driver assistance systems having high availability in complex, high traffic scenarios. For example, the determined (behavioral) lanes 502, 504 of the road from the collective behavior of the vehicles surrounding the ego vehicle 202 may be used to directly control the ego vehicle 202 for active lane keeping functions. The ego vehicle 202 may imitate a swarm behavior in active lane keeping functions. Further, the determined lanes 502, 504 of the road from the collective behavior may be used to assign the objects to the determined lanes or order the objects using the determined lanes. This may be used to determine which objects on the road are in the same lane as the ego vehicle 202. Accordingly, the method 100 may be used to determine which vehicles on the road are relevant for adaptive cruise control, short ACC, systems. More specifically, the method 100 may be used to determine which vehicles on the road should be considered relevant when controlling longitudinal dynamics, e.g. acceleration, deceleration, and breaking, of the ego vehicle 202. Furthermore, the determined lanes of the road may be used to classify how other objects are maneuvering, e.g. how other objects are changing lanes of the road, cancelling a lane change or exiting the road. The ego vehicle 202 may use this information to perform its own maneuvers, e.g. accelerate and/or decelerate to perform a lane change, and/or accelerate and/or decelerate to cancel a lane change.

Figure 8A:
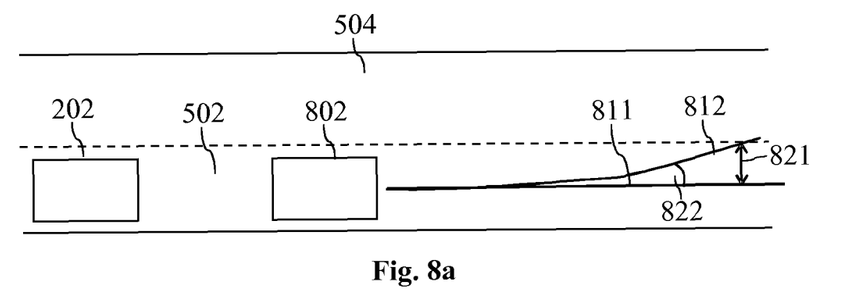
FIG. 8a shows an example of a target following function.

As illustrated in FIG. 8*a*, the ego vehicle 202 may be operated in dependence of a target vehicle 802, which is driving within the same (behavioral) lane 502 as the ego vehicle 202 in front of the ego vehicle 202. The target vehicle 802 may be used to control the longitudinal dynamics of the ego vehicle 202 (e.g. in the context of an ACC system). If the target vehicle 802 performs a lane change, then object following of the ego vehicle 202 using the target vehicle 802 should be disengaged, in order to avoid a possible collision of the ego vehicle 202 with a vehicle in the next lane 504.

As outlined above, the ego vehicle 202, notably a control unit of the ego vehicle 202, may be configured to determine one or more (behavioral) lanes 502, 504 of a road, based on the collective behavior of vehicles 204, 206, 208, 210 driving on the road. In particular, the trajectories 214, 216, 218, 220 of the vehicles 204, 206, 208, 210 may be determined (as described in the context of FIG. 2). Furthermore, the trajectories 214, 216, 218, 220 of the vehicles 204, 206, 208, 210 may be clustered for different segments 302, 304 of the road, in order to determine the overall shape of the road for a sequence of segments 302, 304 (as described in the context of FIG. 3). The shape of the road may be described using a curve 402 which is fitted to the shapes of the sequence of segments 302, 304 (as illustrated in FIG. 4). Using the curve 402 which describes the collective shape of the road, and using the position and/or the trajectories of the different vehicles 204, 206, 208, 210 one or more (behavioral) lanes 502, 504 of the road may be identified (as described in the context of FIGS. 5 to 7).

The one or more lanes 502, 504 of a road, which have been determined using (solely) the collective behavior of vehicles 204, 206, 208, 210 driving on the road, may be referred to herein as behavioral lanes. On the other hand, the one or more lanes of a road, which have been determined using (solely) map data and/or sensor data which indicates lane markings on the road, may be referred to herein as sensed lanes.

The analysis of the collective behavior of vehicles 204, 206, 208, 210 in the environment of the ego vehicle 202 provides a set of models (e.g. a set of curves) that describe the geometry and/or the courses 811 of the behavioral lanes 502, 503, as inferred from the collective behavior of the traffic participants. Furthermore, a confidence measure may be determined that provides an indication on how much the models for the one or more behavioral lanes 502, 504 can be trusted. Examples of the confidence measure include the number of trajectories 214, 216, 218, 220 that contribute to the (different segments 302, 304 of the) collective shape 402, and/or the number of vehicles 204, 206, 208, 210 that can be semantically assigned as driving in each lane 502, 504. In particular, a model for the behavioral ego lane 502 may be determined, within which the ego vehicle 202 and the target vehicle 802 are driving. Furthermore, a confidence measure for the behavioral ego lane 502 may be determined.

In order to be able to decide on whether the target vehicle 802 is changing lanes, the movement profile or trajectory 812 of the target vehicle 802 (which may correspond to the trajectory of the ego vehicle 202 which follows the target vehicle 802) may be compared with the model and/or the course 811 for the one or more behavioral lanes 502, 504. In particular, a lateral offset 821 between the movement profile 812 of the target vehicle 802 and the course 811 of the behavioral ego lane 502 may be determined. Alternatively, or in addition, an angle 822 between the movement profile 812 of the target vehicle 802 and the course 811 of the behavioral ego lane 502 may be determined. Hence, values for one or more deviation parameters 821, 822 describing the deviation of the movement profile 812 from the behavioral ego lane 502 may be determined.

Furthermore, it may be determined from the values for one or more deviation parameters 821, 822 whether the deviation of the movement profile 812 from the behavioral ego lane 502 exceeds a tolerable deviation threshold or corridor around the behavioral ego lane 502. It may then be decided that the target object 802 is changing lanes and/or that the target object 802 may not be used anymore by the ego vehicle 202 as a target object for performing object following.

In order to reduce the number of false detections, the threshold may be determined based on the one or more confidence measures for the one or more behavioral lanes 502, 504. In particular, the confidence threshold may depend on the number of trajectories 214, 216, 218, 220 that have contributed for determining the shape 811 of the behavioral ego lane 502 (wherein the deviation threshold typically increases with decreasing number of trajectories). Alternatively, or in addition, the deviation threshold may be dependent on the number of vehicles 204, 206, 208, 210 which fall within the behavioral ego lane 502 (wherein the deviation threshold typically increases with decreasing number of vehicles).

Hence, a possible confidence measure for the behavioral ego lane 502 is the number of objects 204, 206, 208, 210 that contribute to the shape 811 of the road within a particular segment 302, 304. This confidence measure may be referred to as "shape weight". It should be noted that while object trajectories 214, 216, 218, 220 may have the same shape, they may actually lie within different lanes 502, 503. The confidence measure may take into account whether an object trajectory 214, 216, 218, 220 lies within the ego lane 502 or not.

A further confidence measure for the behavioral ego lane 502 may be the actual number of trajectories that contribute to a specific lane (notably to the ego lane 502). This confidence measure is less than or equal to the shape weight (which is typically lane agnostic).

Depending on the use case, different combinations of these two confidence values may be used (since different functions may have different tolerances with regards to availability, false positives, etc.). For example, for the function where lane keeping is deactivated when the object being followed makes a lane change, it may be sufficient to just consider the shape weight confidence measure, since the relatively low number of false positives is tolerable (as the function would just stop). However, if the function is directed at actively following the behavioral ego lane 502, it may be required that several objects are assigned to the behavioral ego lane 502 in order to increase safety of the function.

The trajectory 812 of the target vehicle 802 and the course 811 of the behavioral ego lane 502 may not be compared in absolute coordinates, but may be compared disregarding a possible constant lateral offset between the trajectory 812 and the course 811. In particular, the trajectory 812 may be shifted laterally to touch the course 811 of the behavioral ego lane 502 at a specified point. Furthermore, it may be verified whether the trajectory 812 and the course 811 diverge from one another or not. By omitting a lateral offset between the trajectory 812 and the course 811, different driver behaviors (such as driving in the middle of a lane, or driving near one side of a lane) may be taken into account within the same method.

Subsequent to detecting that the target vehicle 802 is changing (behavioral) lanes 502, 504, object following may be terminated and/or an alternative vehicle for object following may be identified. Alternatively, or in addition, the course 811 of the behavioral lane 502 may be used to perform active lane keeping of the ego vehicle 202.

In another scenario (illustrated in FIG. 8b), the ego vehicle 202 may perform automatic lane keeping, e.g. based on lane markings on the road that the ego vehicle 202 is driving on. Automatic lane keeping may be undesirable, if there is an obstacle on the lane 502 the ego vehicle 202 is driving on and/or if traffic participants have decided collectively to not follow the (marking-defined) lanes 852, 854 (which may occur e.g. in high-density traffic situations).

Figure 8B:
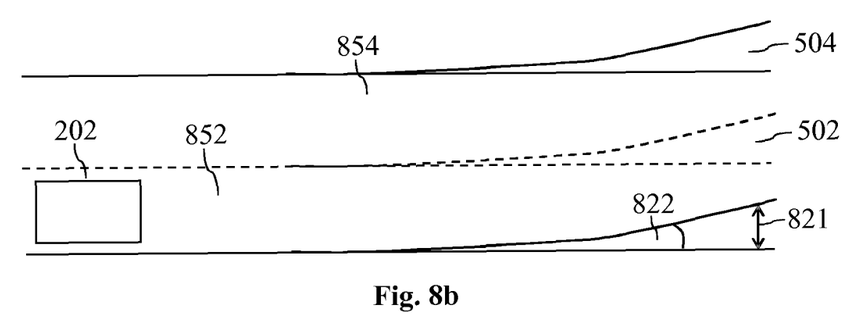
FIG. 8b shows an example of a lane keeping function.

Lane keeping may be performed using the sensed lanes 852, 854 (which have been determined based on the lane markings on the road). The control unit of the ego vehicle 202 may be configured to detect that the behavioral ego lane 502 deviates from the sensed ego lane 852. This may be achieved by determining values for one or more deviation parameters 821, 822 (such as the lateral offset 821 or the angle 822) describing the deviation of the behavioral ego lane 502 from the sensed ego lane 852.

It may be determined based on the values for the one or more deviation parameters 821, 822 whether the deviation of the behavioral ego lane 502 from the sensed ego lane 852 exceeds a deviation threshold or not. The deviation threshold may be dependent on the one or more confidence measures for the behavioral ego lane 502. If it is detected that the deviation exceeds the deviation threshold, automatic lane keeping may be terminated and/or automatic lane keeping may be switched from the sensed ego lane 852 to the behavioral ego lane 502. Alternatively, or in addition, an object following function may be activated automatically (in order perform object following instead of lane keeping).

Figure 9:
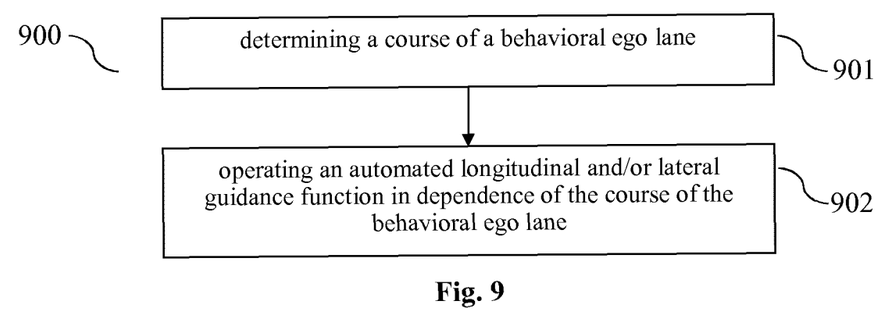
FIG. 9 shows a flow chart of an example method for operating a vehicle.

FIG. 9 shows a flow chart of an example method 900 for operating an automated longitudinal and/or lateral guidance function of an ego vehicle 202. The method 900 may be operated by a control unit of the ego vehicle 202. The method 900 comprises determining 901 a course 811 of an ego lane 502, referred to as the behavioral ego lane, within which the ego vehicle 202 is driving, based on driving trajectories 214, 216, 218, 220 of a plurality of vehicles 204, 206, 208, 210 within an environment of the ego vehicle 202. The course 811 of the ego lane 502 may be determined as outlined in the present document (e.g. using method 100).

Furthermore, the method 900 comprises operating 902 the automated longitudinal and/or lateral guidance function (notably a lane keeping function or a vehicle following function) of the ego vehicle 202 in dependence of the course 811 of the behavioral ego lane 502. By taking into account a behavioral ego lane 502 which has been determined based on the collective behavior of vehicles 204, 206, 208, 210 within the environment of the ego vehicle 202, a robust and reliable automated longitudinal and/or lateral guidance function may be provided.

It should be noted that the term "comprising" does not exclude other elements or steps and the use of articles "a" or "an" does not exclude a plurality. Also, elements described in association with different embodiments may be combined. It should also be noted that reference signs in the claims should not be construed as limiting the scope of the claims. It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The invention claimed is:

1. A control unit for an autonomous and/or semi-autonomous ego vehicle, wherein the control unit is configured to:
   determine a course of a behavioral ego lane within which the ego vehicle is driving based on driving trajectories of a plurality of vehicles within an environment of the ego vehicle;
   operate an automated longitudinal and/or lateral guidance function of the ego vehicle in dependence of the course of the behavioral ego lane;
   determine trajectory data regarding the driving trajectories of the plurality of vehicles;

cluster the driving trajectories within each of a sequence of segments of a road that the ego vehicle is driving on to determine a sequence of shapes of the road for the sequence of segments, wherein
the cluster of driving trajectories is determined by one or more of:
lateral distance between the driving trajectories being below a predefined threshold,
a heading angle deviation between the driving trajectories, or
a longitudinal distance before reaching a particular lateral divergence between the driving trajectories; and
determine the course of the behavioral ego lane based on the sequence of shapes of the road.

2. The control unit of claim 1, wherein
the longitudinal and/or lateral guidance function comprises a vehicle following function, which is configured to perform the longitudinal and/or lateral guidance of the ego vehicle in dependence of a target vehicle driving within the behavioral ego lane in front of the ego vehicle; and
the control unit is further configured to:
determine a target trajectory of the target vehicle;
compare the target trajectory to the course of the behavioral ego lane; and
operate the vehicle following function in dependence of the comparison of the target trajectory with the course of the behavioral ego lane.

3. The control unit of claim 2, wherein the control unit is further configured to:
determine values of one or more deviation parameters indicative of an extent of deviation of the target trajectory from the course of the behavioral ego lane; and
operate the vehicle following function in dependence of the values of the one or more deviation parameters.

4. The control unit of claim 3, wherein the one or more deviation parameters comprise:
a lateral offset between the target trajectory and the course of the behavioral ego lane; and/or
an angle between the target trajectory and the course of the behavioral ego lane.

5. The control unit of claim 2, wherein the control unit is further configured to:
determine whether the target trajectory deviates from the course of the behavioral ego lane by more than a deviation threshold; and
interrupt the vehicle following function with regards to the target vehicle, when it is determined that the target trajectory deviates from the course of the behavioral ego lane by more than the deviation threshold.

6. The control unit of claim 5, wherein the control unit is further configured to:
determine a confidence measure indicative of:
(i) a confidence that the course of the behavioral ego lane corresponds to an actual course of a lane of a road that the ego vehicle is driving on; and/or
(ii) a confidence and/or an unambiguousness with which the behavioral ego lane has been determined; and
determine the deviation threshold in dependence of the confidence measure, such that the deviation threshold increases when the confidence measure decreases and/or such that the deviation threshold decreases when the confidence measure increases.

7. The control unit of claim 1, wherein the control unit is further configured to:

determine lane sensor data indicative of lane markings of a lane of a road that the ego vehicle is driving on;
determine a course of a sensed ego lane based on the lane sensor data; and
perform lateral guidance of the ego vehicle in dependence of the course of the sensed ego lane and in dependence of the course of the behavioral ego lane, to provide a lane keeping function.

8. The control unit of claim 7, wherein the control unit is further configured to:
compare the course of the sensed ego lane with the course of the behavioral ego lane; and
operate the lane keeping function in dependence of the comparison of the course of the sensed ego lane and the course of the behavioral ego lane.

9. The control unit of claim 8, wherein the control unit is further configured to:
determine whether the course of the sensed ego lane deviates from the course of the behavioral ego lane by more than a deviation threshold; and
interrupt the lane keeping function based on the sensed ego lane and/or perform the lane keeping function based on the behavioral ego lane, when it is determined that the course of the sensed ego lane deviates from the course of the behavioral ego lane by more than the deviation threshold.

10. A control unit for an autonomous and/or semi-autonomous ego vehicle, wherein the control unit is configured to:
determine a course of a behavioral ego lane within which the ego vehicle is driving based on driving trajectories of a plurality of vehicles within an environment of the ego vehicle;
operate an automated longitudinal and/or lateral guidance function of the ego vehicle in dependence of the course of the behavioral ego lane;
determine a course of a road along a sequence of segments of the road, based on a sequence of shapes of the road for the sequence of segments;
determine a lane configuration of the road by comparing a total number of driving trajectories covered by each of a plurality of candidate lane configurations and selecting a first candidate lane configuration covering a greater number of driving trajectories than a second candidate lane configuration as the determined lane configuration;
assign the plurality of vehicles to one or more different adjacent lanes of the determined lane configuration of the road, wherein
one of the different adjacent lanes is the behavioral ego lane; and
determine the course of the behavioral ego lane based on the course of the road.

11. A method for operating an automated longitudinal and/or lateral guidance function of an ego vehicle, comprising:
determining a course of a behavioral ego lane within which the ego vehicle is driving, based on driving trajectories of a plurality of vehicles within an environment of the ego vehicle;
operating the automated longitudinal and/or lateral guidance function of the ego vehicle in dependence of the course of the behavioral ego lane; determining trajectory data regarding the driving trajectories of the plurality of vehicles;
clustering the driving trajectories within each of a sequence of segments of a road that the ego vehicle is driving on to determine a sequence of shapes of the road for the sequence of segments, comprising:

determining a first cluster for a first segment of the sequence of segments that includes less than a majority of driving trajectories of the first segment and determining a second cluster for a second, adjacently preceding segment of the sequence of segments that includes a majority of driving trajectories of the second segment.

12. The method of claim 11, wherein the first cluster and second cluster are determined based on one or more driving trajectories of the second cluster of driving trajectories including the majority of driving trajectories of the second, adjacently preceding segment are not continued without interruption by a majority of driving trajectories of the first cluster of the driving trajectories of the first segment.

\* \* \* \* \*